Patented Apr. 29, 1952

2,594,439

UNITED STATES PATENT OFFICE 2,594,439

TABLET JELLIES AND PROCESS OF PREPARING SAME

George Louis Baker, Newark, Del., and Mamie Olliver, Histon, Cambridge, England, assignors to Chivers & Sons Limited, Histon, Cambridge, England, a British company No Drawing. Application April 17, 1950, Serial No. 156,494. In Great Britain April 25, 1949

27 Claims. (Cl. 99—132)

This invention is concerned with improvements in or relating to the manufacture of tablet jellies.

The term "tablet jelly" is used herein to signify a jelly in concentrated form, which on dilution for example by boiling with water and allowing to stand can be caused to set to a jelly suitable for consumption; the term is not intended to restrict the shape and/or size of the products manufactured in accordance with the invention, which products may be produced in any desired shape or size such, for example as tablets, globules, sheets, strips, ribbons and the like.

At present tablet jellies are made with gelatine, agar, alginates and the like as setting agents; gelatine jellies have the disadvantage of being slow setting on making up by the housewife, whilst agar and alginate jellies often lack clarity. Often storage of these jellies results in loss of gelling strength and consequent increase in time required for setting. Loss of gelling strength may also occur during making up, for example if a gelatine tablet jelly is boiled with water.

To overcome these disadvantages the use of low methyl pectin has been proposed, and has resulted in the production of jelly concentrates in powder or crystal form. Such pectin jellies are found to be quick setting as compared to gelatine jellies and do not appreciably lose gelling strength on storing or making up. The manufacture of powders however requires great care and incorporation of liquid fruit juices in such powders is of course difficult.

In our specification No. 69,056, now Patent No. 2,524,416, there is described a method of manufacturing tablet jellies in which low methyl pectin as therein defined is partially dispersed under controlled conditions in an aqueous solution containing a suitable sweetening agent, an edible acid and a soluble edible salt of a polyvalent metal by which method we were enabled to produce a satisfactory concentrated tablet jelly which incorporated the advantages of the prior known jelly concentrates but was free from the above mentioned disadvantages.

We have now found an alternative, and in some respects a more convenient method of manufacturing tablet jellies from low methyl pectin, which enables us to use as starting material an aqueous dispersion either complete or partial of low methyl pectin, such as is normally obtained in the manufacture of such pectins in place of solid pectin as is used in the process of our prior specification. By the use of such aqueous dispersions the prior isolation of the solid pectin is rendered unnecessary.

The term "low methyl pectin" as used herein means a pectin the methoxyl content of which is within the range 1–8.5% on the basis of 100% calcium pectate. Preferably the methoxyl content of the pectin is within the range 4.5–7%.

We have found that if an aqueous dispersion of low methyl pectin and a suitable sweetening agent is introduced into an aqueous solution containing a suitable concentration of a soluble edible salt of a polyvalent metal preferably calcium, in the presence of an edible acid an attractive and satisfactory tablet jelly can be produced.

According to the present invention therefore we provide a method of manufacturing tablet jellies in which an aqueous dispersion of low methyl pectin containing a suitable sweetening agent both as hereindefined is introduced, in the presence of one or more edible acids, into an aqueous solution containing a quantity of a soluble edible salt of a polyvalent metal, preferably calcium so as to form a tablet jelly having 68–80% soluble solids.

As suitable sweetening agents we may use any sugar having sweetening properties, sorbitol, glycerine or an edible sugar-containing compound, such for example as honey. Examples of preferred sweetening agents are sucrose and glucose.

As edible acids we may use any inorganic or organic acid or acids, which will be edible and non-injurious in the proportion used; at present we prefer to use either citric acid, malic acid or tartaric acid. It may here be pointed out that the suitable acid may be furnished in whole or in part by the use of acid-containing fruit juices.

We prefer to add the suitable acid to the solution of the polyvalent metal salt and then to introduce the pectin dispersion into this solution.

As a soluble edible salt of a polyvalent metal we may use any inorganic or organic salts of a polyvalent metal which will be soluble in water or the acid used and will be edible in the proportions used; we prefer to use inorganic or organic salts of calcium such for examples as calcium chloride and the invention accordingly specifically includes the use of such salts.

The quantity of the salt of the polyvalent metal required in the process according to the invention cannot be definitely stated and must be adjusted by experiment to suit the "calcium, or other polyvalent metal tolerance" of the particular sample of pectin used. Thus if insufficient polyvalent metal ion is present the jelly formed will be weak; if the polyvalent metal ion concentration is too high the jelly will be found to exhibit syneresis.

We have found that the amount of polyvalent metal salt required appears to depend mainly on the following factors:

(1) the nature of the polyvalent ion used;
(2) the nature of the low methyl pectin sample used; and
(3) nature of the fruit juices and/or acids used.

Accordingly it is necessary to carry out a few preliminary trial experiments to determine the proportion of metal salt and other conditions for the particular pectin to be used so that a tablet jelly of 68–80% soluble solids content is obtained. In general we prefer to adjust the soluble solids content to about 76%.

The pH of the finished tablet will depend mainly on taste requirements of the table jelly to be made therefrom; at present we prefer to adjust the conditions of the process so that a tablet jelly is obtained which, on dilution, will yield a table jelly the pH of which is within the range of from 2.8–5.5, the preferred value being about 3.4. The pH will depend on the quantity of the suitable acid in the mixture, the acid and buffers present in any fruit juice flavourings used and on the quantity and nature of buffer salts added as hereinafter described.

In order to prevent crystallisation of sugar in the product we have found it desirable to add a quantity of invert syrup to the pectin dispersion at the beginning of the process; to simplify moulding and improve the texture of the finished tablet it is also desirable that the pectin dispersion contains a quantity of glycerine.

Various flavourings including fruit juices, true fruit esters and fruit concentrates may if desired be added to the pectin dispersion; we have found that fruit juices alone do not produce sufficient flavour and are apt to produce an insipid jelly and we may therefore use artificial flavourings. Buffer salts and artificial colouring matter may also be added. Examples of buffer salts which may be used are potassium bitartrate and sodium hydrogen phosphate. It should however be remembered that the addition of fruit juices, buffer salts and the like may affect the pH, and, as already stated, the quantity of polyvalent metal salt required, which should be determined by experiment.

The aqueous dispersions of low methyl pectin used in accordance with the invention preferably contain the pectin in its fully dispersed state; it is possible however to use solutions in which the pectin is almost but not completely dispersed thus for example, if the dispersion had proceeded to the stage where microscopical examination showed that some of the particles of pectin were completely dispersed and some particles were still visible, but that their edges were blurred, such a solution would be suitable for use in the process according to the invention. The use of solutions in which the pectin is only partially dispersed is accordingly within the scope of the present invention and tests must be made on any particular solution to determine whether or not it is capable of forming a tablet jelly under the conditions herein set forth. The amount of low methyl pectin used will depend on the quality of the low methyl pectin used and the gel strength required in the final table jelly.

The aqueous pectin dispersion may be introduced into the acid solution of the polyvalent metal salt in any desired manner, thus, for example a measured quantity of the dispersion may be added directly with stirring to a measured quantity of the metal salt solution in which case attractive globules of droplets are formed; in a further method of carrying out the process the pectin dispersion may be continuously extruded from a suitable reservoir in the form of threads, strips, ribbons or the like and carried through a bath containing the metal salt solution. In a still further method of carrying out the process extrusions or mouldings of the pectin dispersion are sprayed with the metal salt solution.

In order that the invention may be well understood the following examples are given only as illustrations:

*Example 1*

(a) Preparation of the pectin dispersion.

A pectin dispersion or "concentrate" adapted for use in the process according to the invention may be made by mixing 200 g. sucrose with 160 g. of a standardized pectinate of 5.5% methoxyl content to aid dispersion, adding 900 ml. water and heating at 180 to 200° F. until a smooth, uniform dispersion is formed. Then 570 g. of invert syrup of 63% soluble solids content and 850 g. cane sugar are added to the dispersed pectin and the whole concentrated to 75% soluble solids or to 2090 g. final weight with the aid of heat.

(b) 209 g. of the standard sugar-pectinate "concentrate" are heated to 180° F. until melted. The melt is then introduced into a solution consisting of a mixture of 14 ml. glycerol, 2.1 ml. of calcium chloride solution containing 23 mg. of calcium per ml. and 4 ml. of 60% citric acid, while the latter is being stirred. Droplets are formed.

*Example 2*

209 g. of the "concentrate" prepared as described in Example 1(a) are heated with 23 ml. of raspberry juice to 180° F. and maintained at this temperature until the weight has been reduced to 212 g. The mixture is then introduced into a solution consisting of a mixture of 14 ml. glycerol, 4.6 ml. of calcium chloride solution containing 23 mg. of calcium per ml., and 4.6 ml. of 60% citric acid while the latter is being stirred. Droplets are formed. These droplets when heated with four times their weight of diluent such as boiling water will disperse and form attractive table jellies upon cooling.

Where a continuous process is desired, the "concentrate" may be extruded into a bath of glycerine, acid, and calcium chloride solution with these chemicals present in the proportions given above. The forms of extrusion may be varied. The extruded product may be sprayed with a calcium-containing solution similar to that of the bath. Moulding is possible before spraying.

*Example 3*

209 g. of the "concentrate" prepared as described in Example 1(a) are heated to 180° F. until melted. The melt is then extruded through a nozzle with a slit approximately 3 x 0.5 mm. in size, into a bath consisting of approximately 80 ml. of a mixture of glycerol, calcium chloride and citric acid in the proportions of 14 ml. glycerol to 2.1 ml. of a calcium chloride solution containing 23 mg. of calcium per ml., to 4 ml. of 60% citric acid. A strip is formed. If desired the process may be made continuous by withdrawing the strip from one end of the bath at the same rate as it is produced from the nozzle. The strips when heated with four times their weight of a diluent such as boiling water will disperse and form attractive table jellies on cooling.

*Example 4*

A pectin concentrate was made by mixing 200 g. sorbitol with 160 g. of a standardised pectinate of 5.5% methoxyl content to aid dispersion adding 900 ml. of water and heating at 180–200° F. until a smooth, uniform dispersion was formed. 570 g. of invert syrup (63% soluble solids) and 850 g. sorbitol were added to the dispersed pectin and the whole concentrated to 75% soluble solids (or to 2090 g. final weight) with the aid of heat.

209 g. of this concentrate were heated to 180° F. until melted. The melt was then introduced with stirring into a solution consisting of a mixture of 14 ml. glycerol, 2.1 ml. calcium chloride solution (containing 23 mg. of calcium per ml.) and 4 ml. of 60% citric acid. Droplets were formed.

We claim:

1. A concentrated pectin jelly composition in the form of a solid aqueous gel which will form a greater volume of an edible dessert jelly on dissolution in hot water following by cooling, said gel comprising pectin in completely dispersed state the methoxyl content of which pectin is within the range of from 1–8.5% based on 100% calcium pectate, an edible acid, a water soluble edible salt of a polyvalent metal and a sweetening agent selected from the group consisting of sugars, polyhydric alcohols derived from sugars by reduction, glycerine and edible sugar-containing compounds, the soluble solids content of said gel being within the range of from 68–80% by weight.

2. A concentrated pectin jelly composition as claimed in claim 1 in which said polyvalent metal is calcium.

3. A concentrated pectin jelly composition as claimed in claim 1, in which the pectin has a methoxyl content within the range of from 4.5–7%.

4. A concentrated pectin jelly composition as claimed in claim 1, in which the edible acid is selected from the group consisting of citric acid, malic acid and tartaric acid.

5. A concentrated pectin jelly composition as claimed in claim 1, in which the sweetening agent is a sugar.

6. A concentrated pectin jelly composition as claimed in claim 1, in which the pH of the final concentrated composition is so adjusted that the pH of a dessert jelly made therefrom is within the range 2.8–5.5.

7. A concentrated pectin jelly composition in the form of a solid aqueous gel which will form a greater volume of an edible dessert jelly on dissolution in hot water followed by cooling said gel comprising pectin in completely dispersed state the methoxyl content of which pectin is within the range of from 4.5–7%, an edible acid selected from the group consisting of citric acid, malic acid and tartaric acid, a water soluble edible calcium salt and a sugar, the soluble solids content of said gel being within the range of from 68–80% and the pH of a dessert jelly made therefrom being within the range of from 2.8–5.5.

8. A concentrated pectin jelly composition as claimed in claim 7, in which the water soluble edible calcium salt is calcium chloride.

9. A concentrated pectin jelly composition as claimed in claim 7 also comprising a member selected from the group consisting of glycerine and invert syrup.

10. A concentrated pectin jelly composition as claimed in claim 7 also comprising a flavoring material selected from the group consisting of fruit juices, true fruit esters, fruit concentrates and artificial flavorings.

11. A concentrated pectin jelly composition as claimed in claim 7 also comprising an edible buffer salt.

12. A concentrated pectin jelly composition as claimed in claim 7 in which the pH of the final concentrated composition is so adjusted that the pH of a dessert jelly made therefrom is approximately 3.4.

13. A method of manufacturing a concentrated pectin jelly composition in the form of a solid aqueous gel which will form a greater volume of an edible dessert jelly on dissolution in hot water followed by cooling, which method comprises introducing a concentrated aqueous dispersion of pectin the methoxyl content of which is within the range of from 1–8.5% based on 100% calcium pectate and which contains a sweetening agent selected from the group consisting of sugars, polyhydric alcohols derived by the reduction of sugars, glycerine and edible sugar-containing compounds into an aqueous solution of a soluble edible salt of a polyvalent metal in the presence of an edible salt, so as to form a gel the soluble solids content of which is within the range of from 68–80% by weight.

14. A method as claimed in claim 13 in which said polyvalent metal is calcium.

15. A method as claimed in claim 13 in which the edible acid is present in the polyvalent metal salt solution.

16. A method as claimed in claim 13 in which the methoxyl content of the pectin is within the range of from 4.5–7%.

17. A method as claimed in claim 13 in which the edible acid is selected from the group consisting of citric acid, malic acid and tartaric acid.

18. A method as claimed in claim 13 in which the sweetening agent is a sugar.

19. A method as claimed in claim 13 in which the pH of the final concentrated gel is so adjusted that the pH of a dessert jelly made therefrom is within the range 2.8–5.5.

20. A method as claimed in claim 13 in which the soluble solids content of the final concentrated gel is approximately 76%.

21. A method as claimed in claim 13 in which the pectin in the aqueous dispersion is in its fully dispersed state.

22. A method of manufacturing a concentrated pectin jelly composition in the form of a solid aqueous gel which will form a greater volume of an edible dessert jelly on dissolution in hot water followed by cooling, which method comprises introducing a concentrated complete aqueous dispersion of pectin the methoxyl content of which is within the range of from 4.5–7% and which contains a sugar into an aqueous solution of a soluble edible calcium salt, in the presence of an edible acid selected from the group consisting of citric acid, malic acid and tartaric acid, so as to form a gel the soluble solid content of which is about 76% and the pH of a dessert jelly made therefrom is within the range 2.8–5.5.

23. A method as claimed in claim 22 in which the water soluble edible calcium salt is calcium chloride.

24. A method as claimed in claim 22 in which the aqueous dispersion of pectin also contains a member selected from the group consisting of glycerine and invert syrup.

25. A method as claimed in claim 22 in which the aqueous dispersion of pectin also contains a flavoring material selected from the group consisting of fruit juices, true fruit esters, fruit concentrates and artificial flavorings.

26. A method as claimed in claim 22 in which the aqueous dispersion of pectin also contains an edible buffer salt.

27. A method as claimed in claim 22 in which the pH of the final concentrated gel is so adjusted that the pH of a dessert jelly made therefrom is approximately 3.4.

GEORGE LOUIS BAKER.
MAMIE OLLIVER.

REFERENCES CITED

The following references are of record in the file of this patent:

UNITED STATES PATENTS

| Number | Name | Date |
| --- | --- | --- |
| 1,842,768 | Rooker et al. | Jan. 26, 1932 |
| 1,847,356 | Northcutt | Mar. 1, 1932 |
| 1,879,697 | Loesch | Sept. 27, 1932 |
| 2,334,281 | Olsen et al. | Nov. 16, 1943 |